United States Patent [19]

Higginbotham et al.

[11] Patent Number: 4,684,677

[45] Date of Patent: Aug. 4, 1987

[54] THERMOSETTING FLUOROCARBON POLYMER PRIMERS

[75] Inventors: Clark A. Higginbotham, Crystal Lake; James W. Wichmann, Schaumburg, both of Ill.

[73] Assignee: DeSoto, Inc., Des Plaines, Ill.

[21] Appl. No.: 828,980

[22] Filed: Feb. 13, 1986

[51] Int. Cl.[4] .................... C08L 27/14; C08L 27/16; C08L 33/14; C08L 63/02

[52] U.S. Cl. .................... 523/435; 525/108; 523/455; 523/458

[58] Field of Search .................... 523/435; 525/108

[56] References Cited

U.S. PATENT DOCUMENTS

| | | | |
|---|---|---|---|
| 2,888,364 | 5/1959 | Bauer | 523/435 |
| 2,976,257 | 3/1961 | Dawe | 525/108 |
| 3,442,976 | 5/1969 | Gerek | 525/108 |
| 3,773,713 | 11/1973 | Koizumi | 523/435 |
| 4,297,447 | 10/1981 | Yasuda | 528/108 |
| 4,314,004 | 2/1982 | Stoneberg | 428/416 |
| 4,379,885 | 4/1983 | Miller | 525/108 |

FOREIGN PATENT DOCUMENTS

| | | | |
|---|---|---|---|
| 2856676 | 7/1979 | Fed. Rep. of Germany | 523/435 |
| 54-101847 | 8/1979 | Japan | 525/108 |
| 55-25416 | 2/1980 | Japan | 525/108 |
| 1049088 | 11/1966 | United Kingdom | 525/108 |
| 648589 | 2/1979 | U.S.S.R. | 523/435 |

*Primary Examiner*—C. Warren Ivy
*Attorney, Agent, or Firm*—Dressler, Goldsmith, Shore, Sutker & Milnamow, Ltd.

[57] ABSTRACT

Rapid air drying thermosetting solvent solution primer compositions are disclosed which comprise volatile polar organic solvent having dissolved therein a fluorocarbon polymer in an amount of from 20% to 45% of total resin solids, a solvent-soluble, hydroxy-functional copolymer of monoethylenically unsaturated monomers containing from 5% to 30% of hydroxy-functional monoethylenic monomer in an amount of from 0.7 to 1.5 parts of hydroxy-functional copolymer per part of fluorocarbon resin, a resinous polyepoxide in an amount providing from 0.1 to 0.6 part of polyepoxide per part of hydroxy-functional copolymer, and a curing agent reactive with hydroxy functionality, preferably an aminoplast resin, for curing the hydroxy-functional acrylic copolymer and the polyepoxide. The primer is pigmented with inorganic pigment in a weight ratio with respect to the resin solids of from 0.2:1 to 0.8:1.

17 Claims, No Drawings

THERMOSETTING FLUOROCARBON POLYMER PRIMERS

DESCRIPTION

1. Technical Field

This invention relates to flash dry primers containing a fluorocarbon polymer in combination with a resinous polyepoxide and a thermosetting acrylic system.

2. Background Art

Solvent-based flash dry primers containing a fluorocarbon polymer in combination with a resinous polyepoxide and an acrylic copolymer and adapter for spray application are known and disclosed in U.S. Pat. No. 4,314,004 issued Apr. 12, 1983 to J. D. Miller and V. J. Grunewalder and assigned to PPG Industries, Inc. However, the commercial primers made in accordance with that disclosure are thermoplastic, they are pigmented to a pigment to binder weight ratio of about 1:1, the resin solids content is only about 20% when the composition is spray applied, and about 50% of the resin solids is constituted by the fluorocarbon resin.

The large proportion of pigment in the commercial primer described above is needed to speed the removal of solvent. It is intended that the prime coating air dry in a reasonable time prior to the application of a fluorocarbon polymer topcoat. The sole baking operation is employed after the topcoat has been applied. These commercial primers air dry (to a dry appearance) in about 15 minutes, and while it is desired to shorten the drying time, it is important to avoid lengthening it. On the other hand, it is desired to reduce the proportion of pigment because lower pigment loading improves adhesion, especially on chromated aluminum building panels and extrusions.

It is important to employ thermosetting systems because resistance to solvent attack is desirable. In practice it is found that, for one reason or another, all portions of the primed substrate (usually aluminum) do not get overcoated. This forces the primer to be the only protection against chemical attack on those portions of the coated substrate which are not topcoated. The primers now available are stripped from the substrate after only 1-3 double rubs with a methyl ethyl ketone-saturated cloth, and it is desired to improve this inadequate solvent resistance which is indicative of chemical resistance.

It is also desired to increase the solids content of the compositions. Low viscosity is needed for spray application (typically 20-25 seconds in a No. 2 Zahn cup), but the more solvent the greater the volatile emissions, and it is desired to reduce the emissions of organic solvent.

It is particularly desired to reduce the proportion of fluorocarbon polymer in the resin component of the deposited primer film. The fluorocarbon polymer in the primer is needed to adhere the fluorocarbon polymer topcoat, so one must use enough fluorocarbon polymer in the primer to develop adequate resistance to delamination, but the fluorocarbon polymer is expensive and now constitutes about 50% of the total resin solids. It is desired to reduce the proportion of this expensive component without sacrificing delamination resistance.

DISCLOSURE OF INVENTION

In accordance with this invention, a sprayable, solvent-based, flash dry thermosetting primer containing a fluorocarbon polymer in combination with an hydroxy-functional acrylic copolymer, a resinous polyepoxide, and an aminoplast resin is provided. More particularly, a rapid air drying thermosetting solvent solution primer composition is provided which comprises volatile polar organic solvent having dissolved therein a fluorocarbon polymer in an amount of from 20% to 45% of total resin solids, a solvent-soluble, hydroxy-functional copolymer of monoethylenically unsaturated monomers containing from 5% to 30% of hydroxy-functional monoethylenic monomer in an amount of from 0.7 to 1.5 parts of hydroxy-functional copolymer per part of fluorocarbon resin, a resinous polyepoxide in an amount providing from 0.1 to 0.6 parts of polyepoxide per part of hydroxy-functional copolymer, a curing agent reactive with hydroxy functionality, especially an aminoplast resin, for curing the hydroxy-functional acrylic copolymer and the polyepoxide, and the primer is pigmented with inorganic pigment in a weight ratio with respect to the resin solids of from 0.2:1 to 0.8:1.

The primers herein are usually formulated at higher than spray viscosity because the pigment does not remain in suspension at spray viscosity. Thus, and prior to thinning to spray viscosity which is carried out at the time of application, the coating compositions of this invention are packaged at a higher solids content than is appropriate for spray application. Various solvents are commonly used for thinning, such as methyl ethyl ketone, toluene, xylene, butyl acetate, ethyl acetate, and the like. The selection is made based on ambient conditions and the preference of the coating applicator. In the package, the compositions of this invention possess a high resin solids content of at least about 40%, preferably in the range of 42% to 55%. At the time of spray application, the prior commercial primers have a solids content of about 20%, while those used herein have a much higher solids content, typically about 28%. The pigment to resin solids weight ratio is preferably in the range of from 0.3:1 to 0.5:1.

This invention is based on the finding that when one employs an hydroxy-functional copolymer and an aminoplast resin for curing the same, then the fluorocarbon polymer proportion can be advantageously reduced while maintaining good adhesion to the aluminum substrate and good resistance to delamination of the fluorocarbon topcoat. In turn, this allows us to reduce the proportion of pigment while simultaneously providing a faster air dry. The result is a more cost effective primer which dries more rapidly and releases less volatile emission. It also provides a cured film which adequately resists solvent attack.

The fluorocarbon polymer is preferably a homopolymer of vinylidene fluoride, i.e., polyvinylidene fluoride, but one may also employ copolymers of vinylidene fluoride containing a major proportion of vinylidene fluoride. These copolymers desirably contain at least 95 mol percent of the vinylidene fluoride. Suitable comonomers are the halogenated ethylenes, such as symmetrical dichlorodifluoroethylene, 1,1-2-trifluoro-2-chloroethylene, tetrafluoroethylene, vinyl chloride, vinyl acetate, and others. While vinylidene fluoride is the preferred fluorocarbon polymer, the corresponding vinyl fluoride polymers and copolymers are also useful.

The preferred proportion of the fluorocarbon polymer component is from 30% to 38% of total resin solids. The preferred fluorocarbon polymer is polyvinylidene fluoride.

The hydroxy-functional copolymer is subject to wide variation so long it is a solvent-soluble copolymer of monoethylenic monomers containing the previously specified proportion of hydroxy monomer. The hydroxy functionality is essentially the only reactive group in the copolymer, albeit a small amount of carboxyl functionality is permissible, though not essential. The preferred hydroxy monomer content is from 10% to 20%.

Various hydroxy-functional monomers can be used, but it is preferred to use an hydroxyalkyl ester of a monocarboxylic acid, such as acrylic acid or methacrylic acid. The alkyl groups contemplated are primarily those containing from 2–4 carbon atoms and illustrated by ethyl, propyl or butyl. The preferred hydroxy-functional monomer is 2-hydroxyethyl methacrylate. Hydroxy alkyl ethers, such as the hydroxyethyl ether of allyl alcohol, are also useful.

The hydroxy-functional copolymer is preferably the copolymer produced by solution copolymerization in the presence of free-radical polymerization catalyst of monoethylenically unsaturated monomers including the required proportion of hydroxyalkyl acrylate. The other monomers are preferably acrylic esters and methacrylic esters with alcohols containing from 1 to 12 carbon atoms, preferably 1 or 2 carbon atoms. Most preferably, the other monomers consist of at least 50% of methyl methacrylate and the balance ethyl acrylate, most preferably from 55% to 65% methyl methacrylate, balance ethyl acrylate.

The resinous polyepoxide desirably has a 1,2-epoxy equivalency of from about 1.4 to about 2.0 and is preferably a diglycidyl ether of a bisphenol. Many other types of polyepoxides, such as cyclohexane diepoxides, are also useful and well known. While those having a somewhat higher molecular weight than have now been found to be most useful may be used herein, such as those having a molecular weight of about 1,000, it is now preferred to use a diglycidyl ether of a bisphenol having a molecular weight in the range of 350 to 800, especially from 370 to 500. This invention preferably employs from 0.2 to 0.4 part of polyepoxide per part of the hydroxy-functional copolymer, and while the proportion of polyepoxide is sometimes at the upper end of the range specified in patent No. 4,314,004, it may be above that range.

The preferred aminoplast curing agent is simply a formaldehyde condensate with an amine, preferably melamine, to provide a heat-hardening methylol-functional resin. While many aminoplast resins are broadly useful, such as urea formaldehyde condensates and benzoguanamine formaldehyde condensates, it is preferred that the aminoplast resin be a polyalkoxymethyl melamine resin in which the alkoxy group contains from 1–4 carbon atoms. Appropriate melamine-formaldehyde condensates are readily available in commerce and are usually etherified with lower alcohols for use in organic solvent solution, as is well known.

The aminoplast resin is desirably used in an amount of from 5% to 25% of total resin solids, preferably in an amount of from 7% to 20% of total resin solids.

Blocked isocyanate curing agents are also useful, such as isophorone diisocyanate blocked with methyl ethyl ketoxime or octyl alcohol-blocked 2,4-toluene diisocyanate. The class of blocked isocyanate curing agents is well known, and these agents are well known to effect cure by forming urethane groups with the hydroxy functionality on the coating composition when baking causes the blocked isocyanate groups to dissociate and become active.

All ratios and proportions herein are by weight, and the proportion of all resinous materials is based on the total weight of resin solids, and exclude the inorganic pigment. All molecular weights are by calculation, and hence are number average molecular weights.

The volatile solvents are selected in accordance with common practice for the formulation of air drying primers. Thus, other acetate solvents are preferred, as will be illustrated, and ketones, like methyl ethyl ketone, or aromatic hydrocarbons, like xylene are usually used to thin the primers to spray viscosity. While spray application is preferred, this is not the only permissible application technique, as will be evident.

The inorganic pigments which are used are preferably constituted by a mixture of titanium dioxide and a pigment providing corrosion protection, such as a chromate pigment, like strontium chromate. It is preferred to have the titanium dioxide present in an amount of from 5 to 15 parts per part of chromate pigment. Fillers may also be present, such as clay, barium sulfate, calcium carbonate, and the like.

While acidic catalysts may be included in the primer composition, they are not needed herein because the curing temperatures for the polyvinylidene fluoride polymer is quite high, so the N-methylol cure of the hydroxy-functional copolymer and the polyepoxide is adequate in the absence of added catalyst.

The invention is illustrated in the following example of preferred practice.

EXAMPLE

Grind 154 pounds of titanium dioxide, rutile and 17 pounds of strontium chromate into 91 pounds of a 55% solids content solution of an hydroxy-functional acrylic copolymer in dipropylene glycol mono-acetate together with 50 pounds of additional dipropylene glycol mono-acetate. The hydroxy-functional acrylic copolymer is a solution copolymer of 20% ethyl acrylate, 65% methyl methacrylate, and 15% of 2-hydroxyethyl methacrylate. Grinding is continued to a 7½ North Standard grind gauge rating.

The pigment paste produced above is thinned by sequentially mixing in 150 pounds of butyl acetate, 200 pounds of additional 55% solids hydroxy-functional acrylic copolymer solution described above, 64 pounds of a diglycidyl ether of bisphenol A having a molecular weight of 390, and 62 pounds of an etherified melamine-formaldehyde condensate [90% solution in organic solvent] (Monsanto product Resimene 740 may be used). Then 150 pounds of polyvinylidene fluoride polymer (Kynar 500 supplied by Pennwalt, King of Prussia, PA may be used) is sifted in and the mixture is then subjected to high speed agitation until a North Standard grind gauge rating of 6 is obtained.

Viscosity is then adjusted with 92 pounds of dipropylene glycol mono-acetate and 30 pounds of butyl acetate to provide a paint which is packaged and which has sufficient viscosity to maintain the pigments in stable suspension.

The above paint is thinned for spray application by the mixing of from 4 to 5 parts of this paint with 1 part of methyl ethyl ketone, and the thinned paint is sprayed on an aluminum panel to provide a dry film thickness of 0.2–0.4 mil, and allowed to dry in air at room temperature which takes from 5 to 10 minutes. After drying, a polyvinylidene fluoride topcoat is spray applied, and both coatings are then baked which serves to cure the primer to resist 100 or more double rubs with a methyl ethyl ketone-saturated cloth even where no topcoat has been applied. Also, and in comparison with the prior commercial primer described previously, it is observed that there is less discoloration when the baked primer is subjected to acids, like hydrochloric acid.

The thinned composition of this example has a resin solids content at spray viscosity of about 28%.

What is claimed is:

1. A rapid air drying thermosetting solvent solution primer composition comprising volatile polar organic solvent having dissolved therein a fluorocarbon polymer in an amount of from 20% to 45% of total resin solids, a solvent-soluble, hydroxy-functional copolymer of monoethylenically unsaturated monomers containing from 5% to 30% of hydroxy-functional monoethylenic monomer in an amount of from 0.7 to 1.5 parts of hydroxy-functional copolymer per part of said fluorocarbon resin, a resinous polyepoxide in an amount providing from 0.1 to 0.6 part of polyepoxide per part of said hydroxy-functional copolymer, and a curing agent reactive with hydroxy functionality for curing said hydroxy-functional acrylic copolymer and said polyepoxide, said primer being pigmented with inorganic pigment in a weight ratio with respect to the resin solids of from 0.2:1 to 0.8:1.

2. A primer as recited in claim 1 in which said composition is in a package with said pigment stably suspended, and said composition has a resin solids content of at least about 40%.

3. A primer as recited in claim 2 in which said curing agent is an aminoplast resin, the resin solids content is in the range of 42% to 55%, and the pigment to resin solids weight ratio is in the range of from 0.3:1 to 0.5:1.

4. A primer as recited in claim 3 in which said fluorocarbon polymer is present in an amount of from 30% to 38% of total resin solids.

5. A primer as recited in claim 1 in which said hydroxy-functional monomer is present in an amount of from 10% to 20% of the copolymer.

6. A primer as recited in claim 5 in which said hydroxy-functional monomer is 2-hydroxyethyl methacrylate.

7. A primer as recited in claim 1 in which said fluorocarbon polymer is polyvinylidene fluoride.

8. A primer as recited in claim 1 in which said solvent comprises dipropylene glycol acetate.

9. A primer as recited in claim 1 in which said copolymer consists of acrylic monomers and said hydroxy monomer is an hydroxyalkyl acrylate or methacrylate containing from 2 to 4 carbon atoms in the alkyl group.

10. A primer as recited in claim 9 in which said copolymer comprises at least 50% of methyl methacrylate.

11. A primer as recited in claim 1 in which said curing agent is an aminoplast resin and said resinous polyepoxide is a diglycidyl ether of a bisphenol having a molecular weight in the range of 350 to 800 and is present in an amount providing from 0.2 to 0.4 part of polyepoxide per part of said hydroxy-functional copolymer.

12. A primer as recited in claim 11 in which said diglycidyl ether has a molecular weight of from 370 to 500.

13. A primer as recited in claim 3 in which said aminoplast resin is a polyalkoxymethyl melamine resin containing from 1 to 4 carbon atoms in the alkoxyl group and present in an amount of from 5% to 25% of total resin solids.

14. A primer as recited in claim 13 in which said polyalkoxymethyl melamine resin is present in an amount of from 7% to 20% of total resin solids.

15. A primer as recited in claim 1 in which said inorganic pigment is a mixture of titanium dioxide and a chromate pigment.

16. A primer as recited in claim 1 in which said titanium dioxide is present in an amount of from 5 to 15 parts per part of chromate pigment.

17. A primer as recited in claim 1 having a viscosity suited to spray application and having a resin solids content of about 28%.

* * * * *

UNITED STATES PATENT AND TRADEMARK OFFICE
CERTIFICATE OF CORRECTION

PATENT NO. : 4,684,677

DATED : August 4, 1987

INVENTOR(S) : Clark A. Higginbotham et al.

It is certified that error appears in the above-identified patent and that said Letters Patent is hereby corrected as shown below:

Column 6, line 26 (Claim 13, line 13), "alkoxyl" should read --alkoxy--.

Signed and Sealed this

Sixteenth Day of February, 1988

Attest:

DONALD J. QUIGG

*Attesting Officer*  *Commissioner of Patents and Trademarks*